No. 858,904. PATENTED JULY 2, 1907.
W. OSTWALD.
PROCESS OF MANUFACTURING NITRIC ACID.
APPLICATION FILED JUNE 26, 1902.
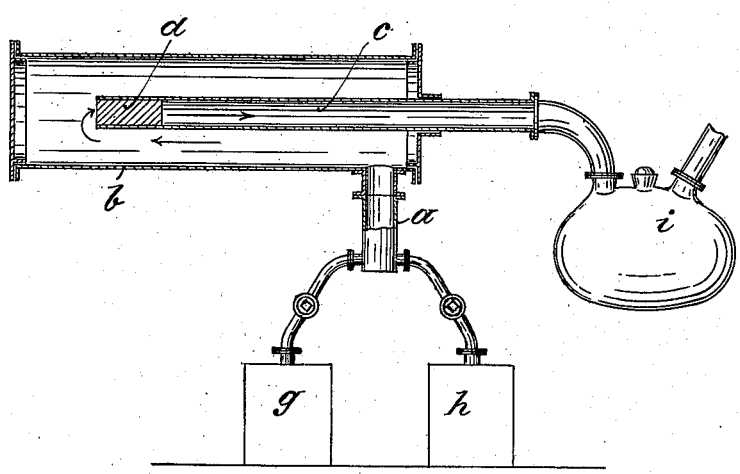

UNITED STATES PATENT OFFICE.

WILHELM OSTWALD, OF LEIPZIG, GERMANY.

PROCESS OF MANUFACTURING NITRIC ACID.

No. 858,904.     Specification of Letters Patent.     Patented July 2, 1907.

Application filed June 26, 1902. Serial No. 113,333.

*To all whom it may concern:*

Be it known that I, WILHELM OSTWALD, doctor of philosophy, a subject of the King of Saxony, residing at Linnéstrasse 2 and 3, Leipzig, Kingdom of Saxony, German Empire, have invented new and useful Improvements in the Process of Manufacturing Nitric Acid, of which the following is a specification.

This invention relates to a process of manufacturing nitric acid from a mixture of ammonia and oxygen, or gases containing oxygen, such as atmospheric air, by means of catalytic agents.

In the accompanying drawing an apparatus by means of which my process may be carried out is represented in a longitudinal section.

In the drawing $a$ is a tube for supplying the gas mixture, $b$ is a tube closed at both ends, $c$ is a tube of smaller diameter than $b$ and open at both ends, said tube passing through one of the end walls of the tube $b$.

$d$ is a catalytic substance allowing the gas mixture to pass through and over it, $g$ and $h$ are pumps for supplying the gases, $i$ is a vessel for condensing the reaction products.

The action of catalytic agents, or so-called contact bodies on a mixture of ammonia and oxygen, whereby nitric acid or nitrogen oxids capable of being converted into nitric acid by the further action of oxygen are produced, is known as a laboratory reaction. But it was hitherto impossible to carry out this process on a practical or technical scale for the reason that the yield in nitrogen oxids from a given quantity of ammonia was too small. Now I have found that by maintaining during the reaction certain definite conditions it is possible to convert ammonia into nitric acid or nitrogen oxids, with nearly the theoretical yield.

Oxygen may react on ammonia by means of catalytic agents in two different ways which, however, may take place simultaneously: (*a*). The ammonia is oxidized to nitric acid. (*b*). The nitric acid formed is instantaneously decomposed whereby nitrogen is formed.
I have found that under certain conditions the first reaction will be the main process whereas the second reaction will practically disappear. The first condition is that the mixture of ammonia and oxygen or air must contain an excess of oxygen when compared with the quantity of ammonia. The quantity of oxygen should at least correspond to the following formula:

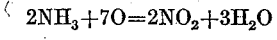

$$2NH_3 + 7O = 2NO_2 + 3H_2O$$

but it is advisable to use a larger quantity of oxygen.
The second condition is that the temperature of the gas mixture while in contact with the catalytic substance is kept at above 300° C. It is preferable to maintain the temperature between dark and bright red heat. Similar conditions for carrying out the reaction are broadly mentioned in chemical text books and cyclopedias, but such mention is merely of laboratory interest, and it is not possible from such brief allusions to utilize the reaction in a practical or commercial way for the technical production of nitric acid. Now I have found that the reason for this is that while in other catalytic processes, such as the formation of sulfur trioxid, the product to be obtained is the final product of the reaction, in this case the nitric acid or nitrogen oxids are not the final products of the reactions. I have stated that two different reactions are involved, namely, the oxidation of ammonia to nitric acid and nitrogen oxids, and a decomposition of the nitric acid and nitrogen oxids, free nitrogen being thus formed. Consequently while in other catalytic reactions the yield cannot be influenced by a longer contact of the reaction products with the catalytic agent—these products not being injured by prolonged contact,—in the production of nitric acid and nitrogen oxids a longer contact of these products with the catalytic agent is injurious because these valuable products are then decomposed and transformed into valueless nitrogen.

Now in all experiments hitherto described the speed with which the gas mixture is allowed to flow over and through the catalytic agent is not at all mentioned, and evidently the speed has been that which was usual in similar catalytic reactions. Now I have found that this speed is too small for obtaining a good yield in nitric acid and nitrogen oxids, these compounds being for too long a time in contact with the catalytic agents, large quantities of nitrogen being thus formed as above described. It is therefore necessary to withdraw the reaction products as soon as possible from the action of the catalytic agents in order to avoid the formation of nitrogen, and by this fact the third condition for practically carrying out the oxidation of ammonia to nitric acid or nitrogen oxids is fixed. Indeed, for obtaining good results it is necessary to allow the gases to flow through and over the catalytic agents with a speed never used hitherto in such reactions and to use therefore as short or thin layer of catalytic substances as practically possible. The only requirement is that the speed must not be so much increased that portions of the ammonia pass through the catalytic agents without being oxidized, but the speed should be approached to this limit as nearly as is possible. Evidently the speed will depend in every special case on the nature, the surface and the distribution of the contact bodies or catalytic agents and must therefore be determined by experiment. In this experiment the speed is increased until unoxidized ammonia can be tested in the reaction products and the speed is then kept a little below this limit, but as near to this limit as it may be practically possible. In other words, the velocity should be such that, if increased, unoxidized ammonia would be found in the product.

When using a catalytic agent composed of solid platinum and platinum-black, as will be further on described, it has been found advantageous to allow the gases to be in contact with the catalytic agent for about one hundredth of a second. It is, however, evident that in practically carrying out the process it is not possible to maintain the speed of the gases absolutely constant, and there will be certain variations of the speed. Now these variations present certain difficulties in practice because when the speed is diminished the catalytic agents are cooled as the quantity of heat of reaction evolved in the unit of time is lessened; and, vice versa if the speed is increased, too much heat is evolved. This must be avoided, and especially the catalytic agent should not be allowed to cool, because in consequence of its small dimensions and weight it might be cooled down so much as not to be longer able to maintain the reaction. For overcoming these difficulties I heat the gas mixture to be oxidized by means of the hot reaction products in such a way that when the gases flow slowly, more heat is transferred to them from the reaction products, and vice versa. For carrying this into practice, I supply the gases in any suitable manner, for instance, as represented in the drawing, by supplying oxygen or air by means of a pump $g$ and ammonia by means of a pump $h$ in such quantities as correspond to the first condition above indicated and mixing these gases in the tube $a$. I then allow the mixture to flow through the tube $b$ along the walls of the tube $c$, then to pass through and over the catalytic or contact body $d$, thence through the tube $c$, and I then conduct the gases to a condensing device $i$ constructed in any known manner.

If the catalytic agent is sufficiently heated at the beginning of the operation, and if the speed of the gases has been regulated for a particular gas mixture and particular catalytic agent as above set forth, the ammonia is oxidized when coming into contact with the catalytic agents. The hot products flow through the tube $c$ and the reaction products are condensed in the vessel $i$. The hot products of reaction will then heat the gases flowing through the tube $b$, and thus the mixture is heated when it comes into contact with the catalytic agent. Now, if the speed of the gases is lessened by any reason, if the gas mixture would come to the catalytic agent with the same temperature as before, this catalytic agent would be cooled as not so much reaction heat would be evolved in the unit of time. The efficiency of the catalytic agent would then be diminished and the reaction might even be entirely stopped. Now, by the arrangement just described, in such a case the gas mixture, before coming to the catalytic agent, is heated to a more elevated temperature than before, as it is in longer contact with the walls of the tube $c$, and more heat is transferred from the hot reaction products to the gas mixture flowing through the tube $b$. In consequence the gas mixture, when arriving at the catalytic agent is heated to a more elevated temperature than before and the catalytic agent is therefore prevented from being cooled. On the other hand, if the speed of the gases is increased, not so much heat is transferred from the reaction products through the walls of the tube $c$ to the gas mixture flowing through the tube $b$ and the mixture arrives to the catalytic agent with a lower temperature than before, the catalytic agent being thus prevented from being overheated. By the heat interchange relation thus provided, the temperature of the catalytic agent is automatically regulated and maintained at the temperature which has been found suitable at the beginning of the operation. No special heating device for the gas mixture is necessary. The initial heating of the catalytic substance may be effected in any suitable way. For instance a flame may be directed towards the contact-body till the regular reaction of the process heats it automatically. The contact-body may if desired be heated by an electrical heating arrangement.

In carrying out this process I use for instance the following materials for making the contact-bodies: Metallic platinum in a solid state, metallic palladium, iridium, rhodium, the oxids, especially the higher oxids, of manganese, lead, silver, copper, chromium, nickel, cobalt, vanadium, molybdenum. A catalytic agent made of solid platinum in combination with platinum in a state of very fine subdivision, such as platinum sponge or the like has been found the most advantageous. It has been found that metallic platinum with a continuous smooth surface effects at red heat the conversion of the ammonia into nitric acid at a moderate velocity of the reaction, while it causes the second reaction mentioned above, viz. the generation of free nitrogen only after a rather long time of contact. The platinum in a state of very fine division on the other hand causes an acceleration of both possible reactions, but a greater one of the second reaction. Thus if it be employed alone in the process, it will generate nitrogen besides the oxids of nitrogen. By combining both the materials, the solid continuous and the finely divided platinum, in such proportions that the second reaction is insignificant the generation of nitric acid is considerably accelerated.

For preparing the described catalytic agent composed of compact and finely divided platinum, I coat compact platinum with a paste of ammonium platinum chlorid and water, and treat the paste at a suitable temperature sufficient for transforming the ammonium platinum chlorid into porous platinum. The distribution of the paste, and therefore of the finely divided platinum may be determined by the competent workman by way of experiment for any required case.

The arrangement of the catalytic agent for this process may be various. Generally a length of one to two centimeters of platinum is sufficient, when the gas mixture flows with a speed of 1 to 5 meters per second. If the gas is passing with a lower speed a shorter length of platinum may be used and vice versa. The catalytic agent for example may be made of ribbons of platinum-plates placed side by side, the plates being alternately plane and grooved, undulated, or made uneven in any way. By this arrangement pipe-like channels, lying side by side, are presented to the passing gas mixture. Another arrangement of the catalytic agent is to place ribbons of platinum plates, alternately longitudinally and transversely grooved, one upon another, or generally to combine several of these ribbons, made uneven in the same way, with ribbons made uneven in any other way. Farther on, the catalytic agent may be made of a wire net, or of a perforated plate through the openings of which the gases are driven. If necessary it may be made of several such plates one placed behind the other. Moreover suitably shaped bodies of a material offering resistance, for instance porcelain, may be coated with platinum by a mechanical, an electrical, or a chemical process and such bodies may be arranged as layers of a suitable thickness. Finally small turnings, chips, or balls of wire, or any other suitable masses of any shape having a great surface and forming permeable plates or the like, may be used for this purpose. The special form will be chosen by the competent workman according to the convenience of the special case.

For carrying the invention into practice it has furthermore been found advantageous to make the mixture of air and ammonia gas in a special manner. In this process gas mixtures containing but little ammonia may be used with success. Therefore, the mixture of ammonia and air may be produced in the following way. Gaswater, putrid urine, or other liquids containing ammonia are treated, according to the principle of the counter current, with air, after being mixed, if necessary, with lime or another strong alkali for the purpose of decomposing the salts of ammonia. The ammonia is thus taken up by the air. By treating the liquids in such a manner that fresh air comes in contact with a nearly exhausted liquid, and the air rich in ammonia goes through the fresh liquid, there will thus be secured a nearly complete utilization of the ammonia with a minimum of air.

The proportions of ammonia to air in this process may be much less than 1/10 without seriously injuring the production of nitric acid. Therefore the utilization of the diluted ammonical liquids may be effected at ordinary temperature or with very little heat. By employing heat in this process also very dilute liquids may be utilized which would scarcely permit any other technical utilization. The heat created by the production of nitric acid may also be used for driving out the ammonia from these liquids.

What I claim is:

1. The herein described process of manufacturing nitric acid and nitrogen oxids, which consists in conducting a mixture of ammonia and oxygen bearing gases in substantially the proportions specified over a catalytic agent at a speed such that, if increased, unoxidized ammonia will appear in the reaction products.

2. The herein described process of manufacturing nitric acid and nitrogen oxids, which consists in conducting a mixture of ammonia and oxygen bearing gases in substantially the proportions specified over a catalytic agent, and flowing the reaction products in heat interchanging relation with the mixed gases passing to the catalytic agent, whereby the catalytic agent is maintained at the suitable temperature for the reaction irrespective of variations in the speed of flow of the gases.

3. The hereinbefore described process of manufacturing nitric acid and nitrogen oxids which consists in conducting a mixture of ammonia and gases containing oxygen in the proportion of at least seven atoms of oxygen to two molecules of ammonia at a temperature exceeding 300° C, over and through a catalytic agent with a speed approached as much as practically possible to the limit beyond which unoxidized ammonia is found in the escaping gases, and condensing the oxidation products.

4. The hereinbefore described process of manufacturing nitric acid and nitrogen oxids which consists in conducting a mixture of ammonia and gases containing an excess of oxygen in the proportion of at least seven atoms of oxygen to two molecules of ammonia at a temperature exceeding 300° C. over and through a catalytic agent with a speed approached as much as practically possible to the limit beyond which unoxidized ammonia is found in the escaping gases, conducting the reaction products in heat interchanging relation to the gas mixture flowing to the catalytic agent and thereby transferring more heat from the reaction products to the gas mixture if the speed is diminished and less heat if the speed is increased, and condensing the oxidation products.

In witness whereof I have hereunto signed my name this 11th day of June 1902, in the presence of two subscribing witnesses.

WILHELM OSTWALD.

Witnesses:
OSCAR GROS,
PAUL V. SCHROEDER.